United States Patent [19]

Omae et al.

[11] 4,337,509
[45] Jun. 29, 1982

[54] METHOD AND APPARATUS FOR CONTROLLING FIRING PHASES OF THYRISTORS

[75] Inventors: Tsutomu Omae; Toshihiko Matsuda, both of Hitachi, Japan

[73] Assignee: Hitachi, Ltd., Tokyo, Japan

[21] Appl. No.: 171,266

[22] Filed: Jul. 22, 1980

[51] Int. Cl.³ .............................................. H02P 5/16
[52] U.S. Cl. ................................ 363/128; 318/345 E; 323/241
[58] Field of Search ............................ 318/341, 345 E; 323/241, 322; 363/79, 85, 87, 88, 128, 129

[56] References Cited

U.S. PATENT DOCUMENTS

| | | | |
|---|---|---|---|
| 3,562,625 | 2/1971 | Broek | 363/87 |
| 3,601,674 | 8/1971 | Joslyn et al. | 318/318 |
| 3,648,148 | 3/1972 | Bechet et al. | 363/87 X |
| 4,090,116 | 5/1978 | Lippitt | 318/345 E |

Primary Examiner—A. D. Pellinen
Attorney, Agent, or Firm—Craig and Antonelli

[57] ABSTRACT

A digital control system for controlling firing pulses supplied to thyristors for power conversion to desired phases, wherein data necessary for obtaining desired phase control signals is set in a counter which normally counts clock pulses having a predetermined period and the firing pulses are generated in synchronism with the generation of overflow pulses from the counter. The data setting to the counter, which is repeated at a period shorter than that of the source voltage, is performed by reading out the actual count value of the counter by a digital arithmetic processor circuit, by correcting the read value by the use of the value corresponding to a desired phase and by setting the corrected value again in the counter.

15 Claims, 7 Drawing Figures

METHOD AND APPARATUS FOR CONTROLLING FIRING PHASES OF THYRISTORS

BACKGROUND OF THE INVENTION

This invention relates to a pulse phase control method and apparatus and more particularly to a method and apparatus for controlling the phase of a firing pulse signal applied to a power conversion thyristor or an electrostatic bulb equivalent thereto.

In the case where a dc motor is controlled by a stationary Leonard system, an ac power source and thyristors connected therewith are customarily used and the voltage applied to the dc motor from the power source is controlled by controlling the firing phases of the thyristors. With this type of control system, there is a need for a circuit for generating gating pulses for the thyristors which pulses have a fixed phase relationship according to a control command, with respect to the instant when the voltage of the ac power source crosses zero in its excursion.

U.S. Pat. No. 3,601,674 discloses a method in which the contents of a register for setting data representative of the phase of a firing pulse and the contents of a counter for counting clock pulses having a constant frequency are compared in a digital comparator which in turn generates an output pulse when both the contents coincide with each other. This method, which can change the data at any desired moment, has an advantage that a quick response characteristic can be obtained. On the other hand, Japanese Pat. No. 3452/78 has proposed a method in which after data representative of the phase of a firing pulse has been set in a counter in synchronism with an ac source voltage, the counter counts clock pulses having a constant frequency, so that a firing pulse is generated in response to an overflow pulse delivered by the counter. This method, contrary to the first-mentioned method, can dispense with the digital comparator and therefore is more simple in construction. However, it has a disadvantage that a rapid response is impossible since the data can be changed only once within a cycle of the source voltage.

SUMMARY OF THE INVENTION

One object of this invention is to provide a method and an apparatus for controlling the phases of firing pulses, according to which firing pulses are generated by a simple digital circuit and a quick response is effected.

Other objects of this invention will be apparent when one reads the following description of the preferred embodiments of this invention.

According to this invention, there is provided a method and an apparatus in which there is provided a counter which generates an output pulse when counting a predetermined number of clock pulses having a predetermined period, a value corresponding to a control command is set in the counter, and a firing pulse is produced from an output pulse obtained when the counter counts the number of clock pulses equal to said predetermined number minus the value set in the counter. The control command is calculated at least two or more times during an interval of time in which one firing pulse is to be produced. The setting of the counter is performed so that each time the results of the calculation of the command signal are obtained, the counter has been set with a value corresponding to the results of the calculation at the start of said interval of time.

With this way of setting, the firing pulse phase can be set in the counter at any moment during the operation of the counter. Accordingly, the set value can be changed any desired number of times within a cycle of the power voltage so that a rapid response can be effected in obtaining a firing pulse having a desired phase. Moreover, there is no need for a data setting register and a digital comparator, and the desired firing pulse can be obtained with a simple circuit configuration.

DESCRIPTION OF THE PREFERRED EMBODIMENTS

FIGS. 1 to 4 show a first embodiment of this invention which is applied to a speed control system for a dc motor.

Figure 1:
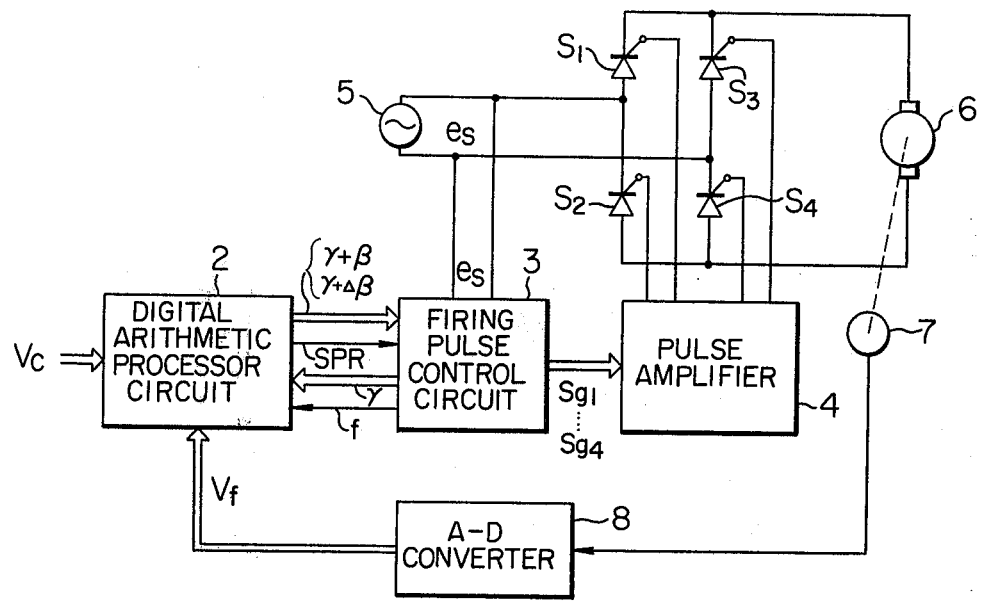
FIG. 1 shows in block diagram the general constitution of a first embodiment of this invention.

As shown in the block diagram in FIG. 1, the speed control system comprises a digital arithmetic processor circuit 2, a firing pulse control circuit 3, a pulse amplifier 4, a single-phase ac power source 5, thyristors $S_1$, $S_2$, $S_3$ and $S_4$, a dc motor 6, a tachometer generator 7, and an A-D converter 8. The digital arithmetic processor circuit 2 is a sort of computer operating on a program stored therein and consists mainly of a central arithmetic processing unit and a memory for storing the program and data therein. It may alternatively use a central arithmetic processing unit of an LSI configuration called a microprocessor. The digital arithmetic processor circuit 2 takes in a speed command $V_c$ given by a presetting operation or by a higher-level control system not shown and a speed feedback signal $V_f$ detected by the tachometer generator 7 and the A-D converter 8. The digital arithmetic processor circuit 2 determines the firing phase of the thyristors, i.e. the timing in which the thyristors are to be fired, on the basis of the speed command $V_c$ and the speed feedback signal $V_f$ and also delivers data representative of the phase of a firing pulse to the firing pulse control circuit 3 so as to cause it to generate firing pulses in that timing. The firing pulse control circuit 3 generates pulses $S_{g1}$–$S_{g4}$ in the proper phase to fire the thyristors $S_1$, $S_2$, $S_3$ and $S_4$ in accordance with the synchronizing signal from the ac power source 5 and the delivered data from the digital arithmetic processor circuit 2. The pulses $S_{g1}$–$S_{g4}$ are amplified by the pulse amplifier 4 and supplied as gating pulses to the thyristors $S_1$–$S_4$, respectively. During the positive half of a cycle of the ac source voltage, the conduction durations of the thyristors $S_1$ and $S_4$ are controlled while the conduction durations of the thyristors $S_2$ and $S_3$ are controlled during the negative half cycle of the ac voltage.

Figure 2:
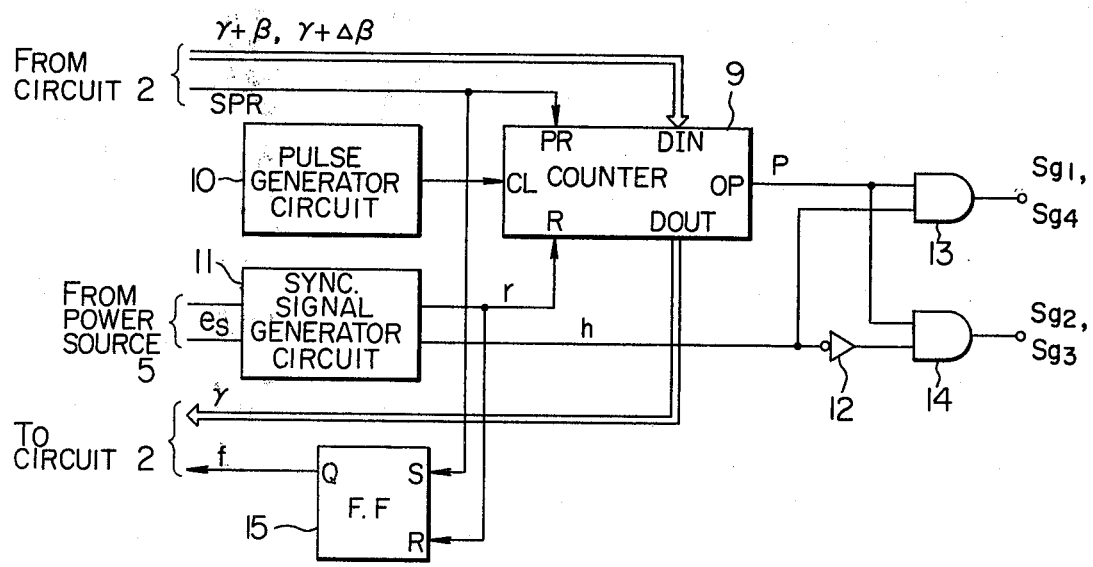
FIG. 2 shows in some detail the firing pulse control circuit shown in FIG. 1.

FIG. 2 exemplifies a specific example of the firing pulse control circuit 3 shown in FIG. 1. A binary counter 9 has its data input and output terminals DIN and DOUT connected with the digital arithmetic processor circuit 2. The binary counter 9 also has its clock input terminal CL which receives clock pulses generated by a pulse generator circuit 10. The frequency $f_c$ of the clock pulses is given by $$f_c \cdot T_o = 2^N \tag{1}$$

where N is the number of bits of the counter 9 and $T_o$ is half the period of the ac source voltage 5.

A synchronous signal generator circuit 11 delivers both a signal h which has level "1" during the positive half cycle of the ac source voltage 5 and a signal r whose constituent pulses rise in synchronism with the zeros of the voltage 5. The signal r is supplied to a reset terminal R of the counter 9 so that the counter 9 is reset each time the ac source voltage crosses zero. The counter 9 continues to count up in accordance with the clock pulses and overflows immediately before the next coming zero of the ac source voltage unless data from the digital arithmetic processor circuit 2 is set in the counter 9. If data is set between adjacent zeros of the source voltage, the timing of overflow depends on the value of the set data. Therefore, the phase of the overflow pulse P can be controlled by the data set to the counter 9. Namely, the present embodiment uses a simplified counter of a type in which an output pulse is produced when the counter overflows by the counting of clock pulses.

An inverter 12 and AND gates 13, 14 constitute a distributing circuit, which properly distributes the overflow pulse P. Namely, during the positive half cycle of the ac source voltage the overflow pulse P is passed through the AND gate 13 to become signals $S_{g1}$ and $S_{g4}$ indicative of the firing timing of the thyristors $S_1$ and $S_4$, while during the negative half cycle of the ac source voltage the overflow pulse P is sent through the AND gate 14 to become signals $S_{g2}$ and $S_{g3}$ indicative of the firing timing of the thyristors $S_2$ and $S_3$.

The configuration of the firing pulse control circuit 3 is featured in that the data output terminal DOUT of the counter 9 is connected with the digital arithmetic processor circuit 2 and that the current count value $\gamma$ read out of the terminal DOUT can be used as a reference to the data set in the counter 9. With this configuration, the data can be set at any desired moment no matter what value the counter 9 may reach and the adjustment of the phases of output pulses can be renewed many times during the half period of the ac source voltage.

A flip-flop 15 is set by a stroke signal SPR for providing the timing of setting data in the counter 9 and reset by the signal r. The output f of the flip-flop 15 indicates that data has been set in the counter 9 during the previous half cycle of the source voltage.

Figure 3:
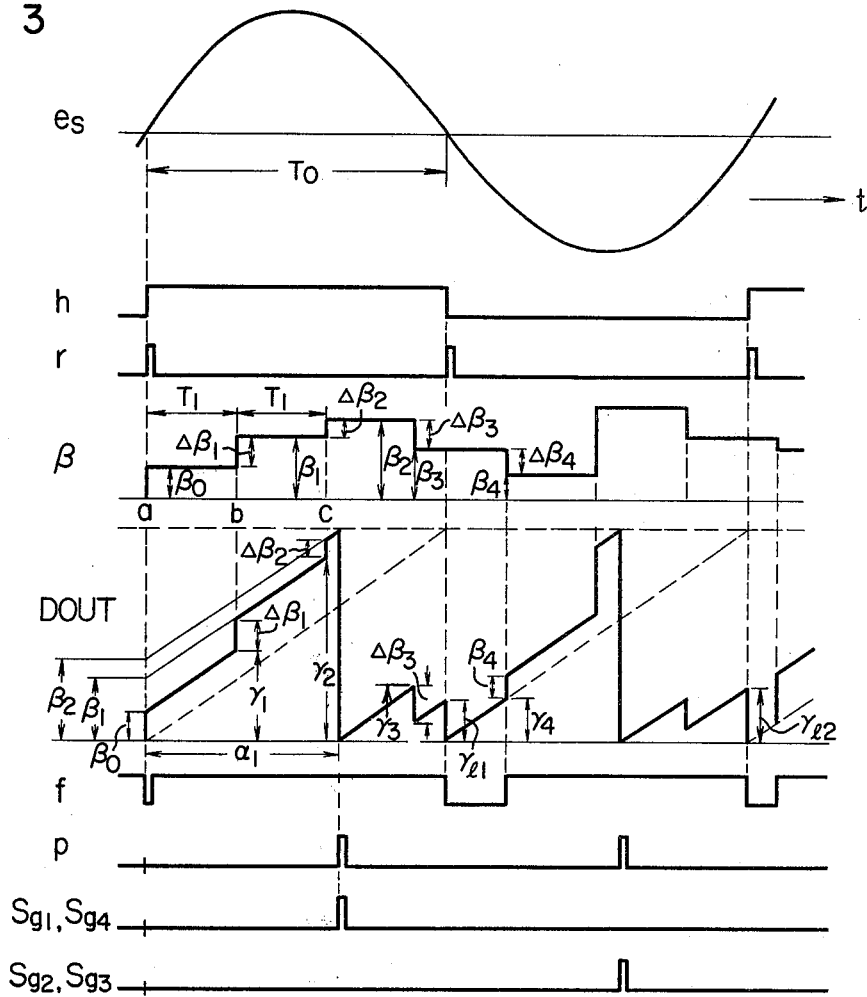
FIG. 3 shows waveforms useful in explaining various parts of the operation of the circuit shown in FIG. 2.

In this embodiment, the setting of data from the digital arithmetic processor circuit 2 in the counter 9 is repeated at a constant period $T_1$. FIG. 3 shows the waveforms of various signals occurring in such a setting operation as described above. In the figure, $e_s$ denotes the voltage of the source 5 and $\beta$ represents the phase control signal which was derived as a preset value for the counter 9 by means of the digital arithmetic processor circuit 2.

At point a, where the flip-flop 15 is reset by the signal r, the output of the flip-flop 15 is at level "0." Since this point corresponds to the instant of the initial data setting during the half cycle of the source voltage, the sum of the value $\beta_o$ calculated by the circuit 2 and the value $\gamma$ read out of the terminal DOUT of the counter 9 is set in the counter 9. However, it should here be noted that only the value $\beta_o$ is set in the counter 9 since at the point a the counter 9 has just been reset, that is, DOUT=0. At this time, the stroke signal SPR serves also as a setting signal for the flip-flop 15, which setting signal causes the output f to be of level "1." Thus, once the value $\beta_o$ is set, the contents of the counter 9 continue to increase so that the counter 9 is to deliver an overflow pulse P having such a phase $\alpha$ (degree) as represented by the following equation $$\alpha = \left(1 - \frac{\beta_o}{2^N}\right) \times 180 \tag{2}$$

At point b, however, the digital arithmetic processing circuit 2 changes the phase of firing the thyristors. At this point b, the output f of the flip-flop 15 is at level "1" and therefore the increment of $\beta_1$, i.e. $\Delta\beta_1$, instead of $\beta_1$ itself should be taken into consideration in the data setting. Namely, the sum of $\Delta\beta_1$ and the value $\gamma_1$ read out of the terminal DOUT at the point b is set in the counter 9. If the control signal remains unaltered, the firing phase $\alpha$ is given by the equation $$\alpha = (1 - \beta_1/2^N) \times 180 \tag{3}$$

and the contents of the counter 9 are changed so that the overflow pulse may be delivered corresponding to the value determined in accordance with $\beta_1$. When the value $\beta$ is changed again at point c, a similar processing is executed so that $\Delta\beta_2 + \gamma_2$ is set in the counter 9 and the overflow pulse P is delivered at the point $\alpha_1$ by the counter 9. The phase point $\alpha_1$ is given by the equation $$\alpha_1 = (1 - \beta_2/2^N) \times 180 \tag{4}$$

In this way, the data setting to the counter 9 takes place each time the control signal $\beta$ is changed, before the generation of the overflow pulse P and the phase at which the pulse P is delivered is controlled on the basis of the value of the last set control signal, whereby this control system can assure a rapid response.

Figure 4:
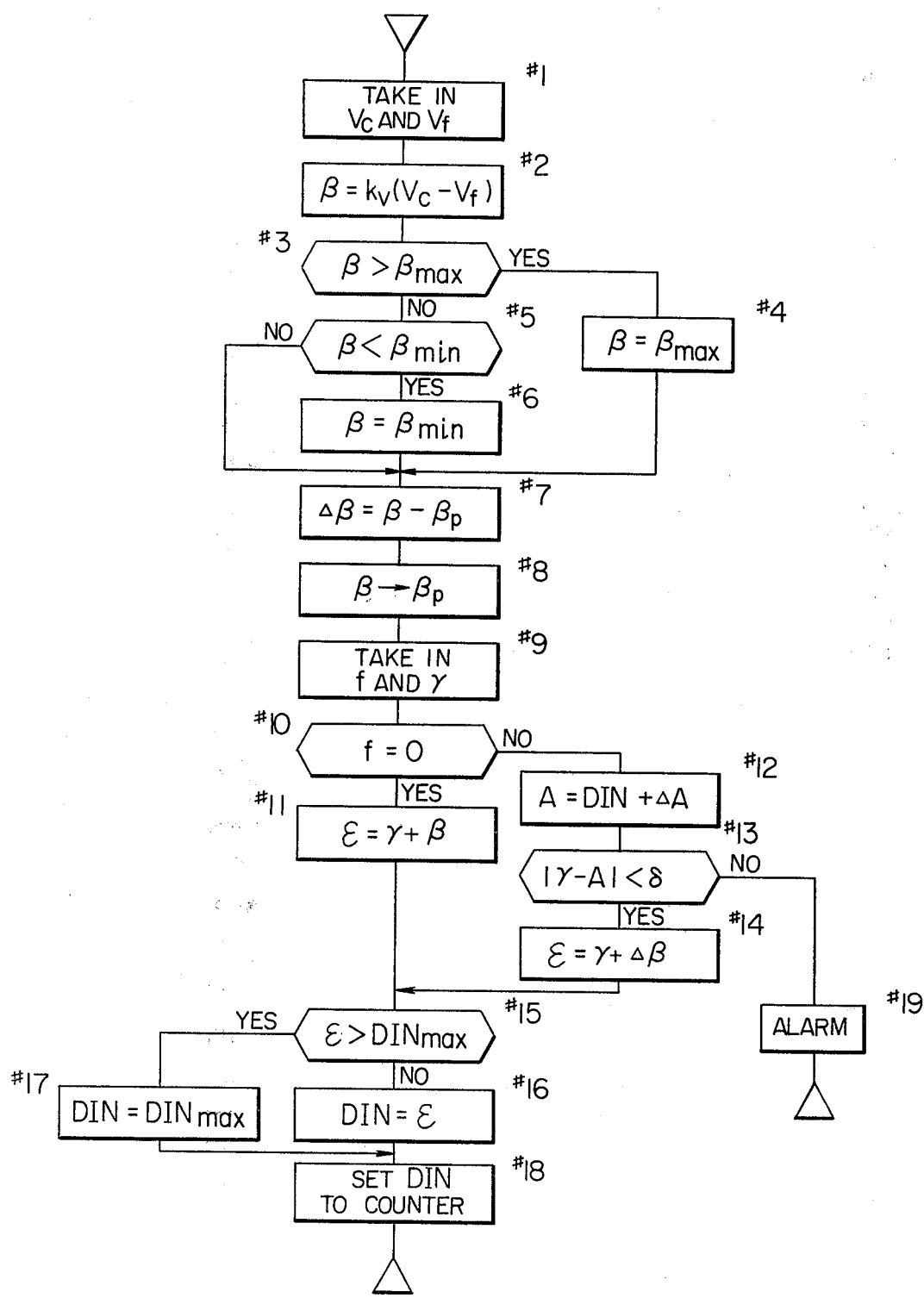
FIG. 4 is a flow chart illustrating the operation of the digital arithmetic processor circuit shown in FIG. 1.

FIG. 4 is a flow chart illustrating the operation of the digital arithmetic processor circuit 2 and the operation is repeated at a period $T_1$ by this embodiment.

In step #1, the speed command $V_c$ and the speed feedback signal $V_f$ are initially taken in. Then, from $V_c$, $V_f$ and the predetermined constant $k_v$, $\beta$ is obtained by the use of the following equation $$\beta = k_v(V_c - V_f) \tag{5}$$

If $\beta$ is equal to or greater than a predetermined maximum value $\beta_{max}$, $\beta$ is made equal to $\beta_{max}$ in step #4 and then step #7 is reached. On the contrary, if $\beta$ is smaller than the predetermined maximum value $\beta_{min}$, $\beta$ is set equal to $\beta_{min}$ in the step #6 and then step #7 is reached. In the step #7, the difference $\Delta\beta$ between the value $\beta_p$ of $\beta$ during the just previous arithmetic period and the current value of $\beta$ is obtained, i.e. $\Delta\beta = \beta - \beta_p$. And the current value $\beta$ is stored as the $\beta_p$ for the calculation in the next period. With this calculation, $\beta$ and $\Delta\beta$ are obtained. Next, in step #9, the output f of the flip-flop 15 and the value γ from the terminal DOUT of the counter 9 are taken in. Data setting to the counter 9 ensures according to the flow from step #10 to step #18. Namely, since the data setting is the initial one during the half cycle of the source voltage when the output f is at level "0," the value (γ+β) is supplied to the terminal DIN of the counter 9. And in like manner the value (γ+Δβ) is supplied to the terminal DIN of the counter 9 when the output f is at level "1."

When the value ε such that ε=γ+β or that ε=γ+Δβ, to be supplied to the terminal DIN is calculated, it may sometimes exceed the maximum count value $DIN_{max}$ of the counter 9. If such a value ε in excess of $DIN_{max}$ is set in the counter 9, no overflow pulse P is delivered during the associated cycle of the source voltage. Accordingly, check is made in step #15 of whether ε exceeds $DIN_{max}$ or not. If ε>$DIN_{max}$, the maximum count value $DIN_{max}$ is set in the counter 9 in step #17. Then, the counter 9 delivers an overflow pulse P as soon as it has received the next clock pulse.

Further, in this embodiment, the digital arithmetic processor circuit 2 monitors whether the counter 9 is operating in the normal condition or not. The time from the instant the data is set in the counter during the last cycle to the instant the count value of the counter is taken in the step #9, remain constant from cycle to cycle so that the number of the stepwise increments of the contents of the counter 9 will remain the same every cycle. Then, in step #12, the value DIN set in the counter 9 in the last cycle and the already known, constant number ΔA of stepwise increments are added together to obtain an expected value A for the content of the counter 9. In step #13, the actual count value γ read out of the counter 9 is compared with the expected value and if the difference between them exceeds δ, the counter is found to be in the abnormal state and accordingly an alarm is started in step #19.

As described above, according to this embodiment, since the phase control signal β according to the speed deviation is set in the counter 9 at a period shorter than the period of the source voltage, a speed control with a rapid response can be realized.

Figure 5:
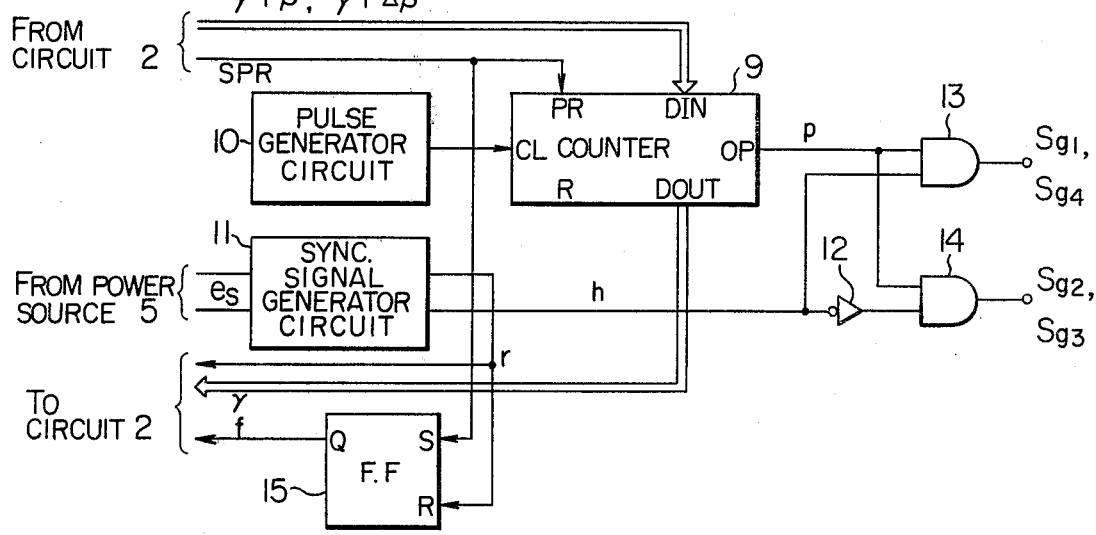
FIG. 5 shows in block diagram the circuit of a second embodiment of this invention.
Figure 6:
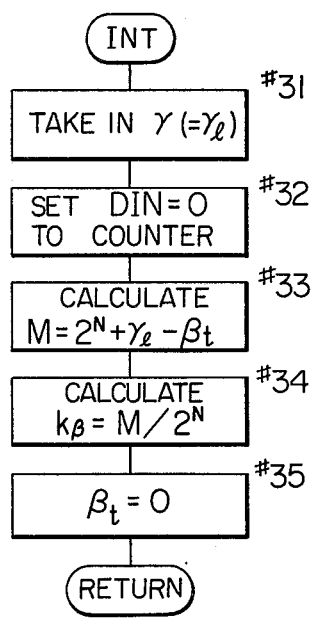
FIG. 6 and FIG. 7 are flow charts illustrating the operation of the digital arithmetic processor circuit used in the second embodiment of this invention.
Figure 7:
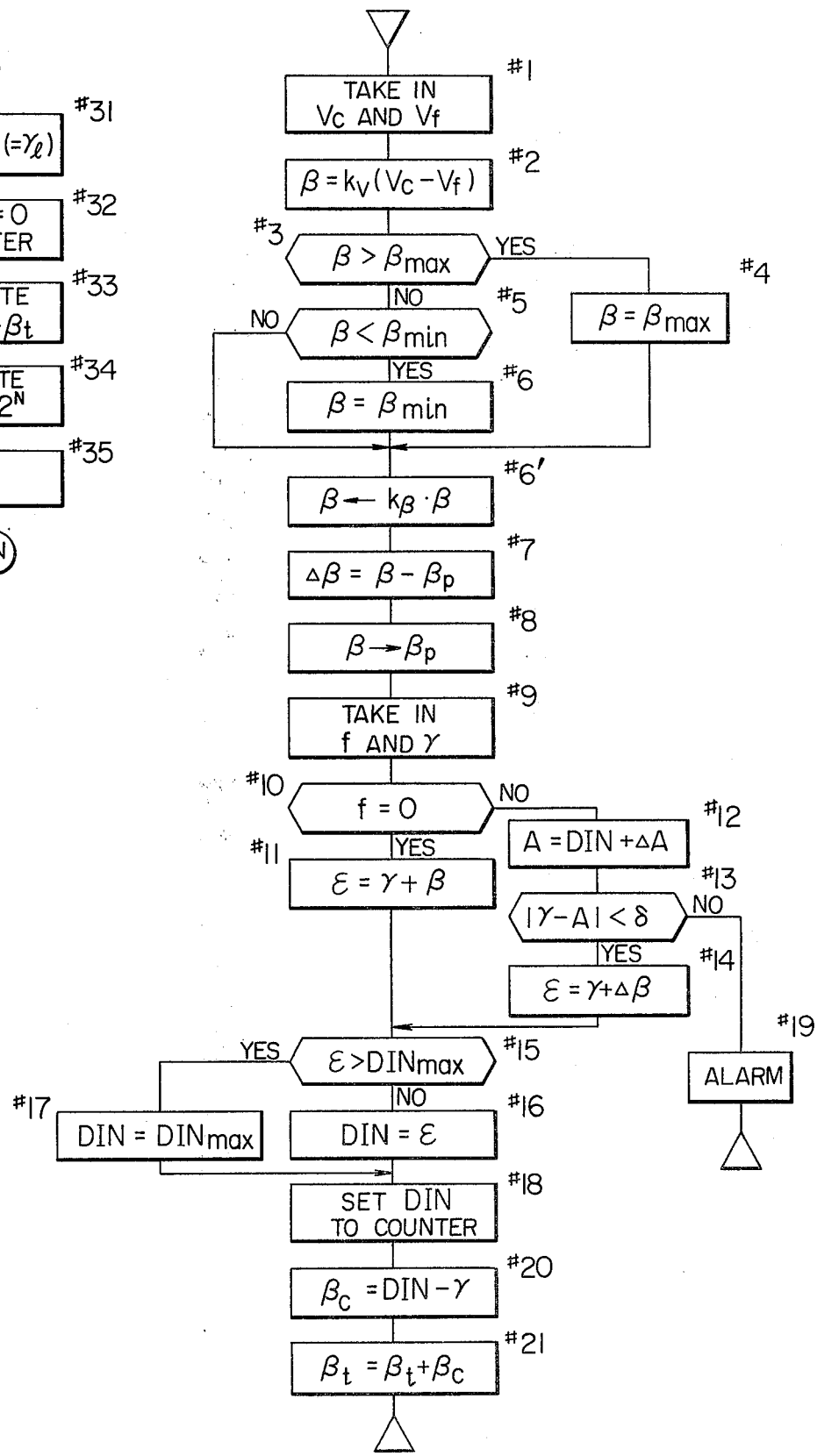

FIGS. 5 to 7 concern a second embodiment of this invention which is applied to the case where the period of the source voltage is variable.

FIG. 5 shows a firing pulse phase shift control circuit as a second embodiment of this invention. This circuit differs from that shown in FIG. 2 only in the way of applying a reset pulse to the counter 9. Namely, in the circuit in FIG. 2, the counter 9 is reset by the pulse r delivered by the synchronous signal generator circuit 11 while in the circuit in FIG. 5 the pulse r is an interrupt signal to the digital arithmetic processor circuit 2. So far as the other parts and constitution are concerned, these embodiments are identical with each other and therefore the same reference numerals are applied to equivalent parts. Especially, since the frequency $f_c$ of the pulses generated by the pulse generator circuit 10 satisfies the above-given equation (1), $2^N$ clock pulses are supplied to the counter 9 during the half cycle of the source voltage if the frequency of the source voltage is exactly equal to the rated value and if the half cycle of the source voltage equals $T_o$ exactly.

According to this second embodiment of the present invention, the number M of the clock pulses actually applied to the counter 9 during the current half cycle is calculated from the contents of the counter 9 (defined as the count value $γ_l$ since it is reached latest before the reset of the counter 9) reached at the instant the signal r caused an interrupt, the fluctuating ratio of the source voltage period is estimated by the ratio of M to $2^N$, and firing pulses having desired phases are intended to be produced irrespective of the fluctuation of the period of the source voltage.

According to this embodiment, the digital arithmetic processor circuit 2 repeats the series of operations shown in the flow chart in FIG. 6 each time the circuit is interrupted by the pulse r. The circuit 2 also repeats the series of operations shown in the flow chart in FIG. 7 at a constant period $T_1$.

The processing executed in synchronism with the zeros of the source voltage will be explained with the aid of FIG. 6. In step #31, the last count value $γ_l$ in taken in from the terminal DOUT of the counter 9. The value $γ_l$ is the quantity represented by $γ_{l1}$ or $γ_{l2}$ in FIG. 3. In step #32, the value DIN=0 is set in the counter 9. As a result of this, the counter 9 is reset. In step #33, the number M of the clock pulses actually supplied to the counter 9 during the half cycle of the source voltage, is calculated by the use of the equation:

$$M = 2^N + γ_l - β_t \qquad (6)$$

where $β_t$ is the accumulate amount of the β's and the Δβ's sequentially set in the counter 9 in the successive half cycles of the source voltage up to the time when the calculation is performed. For example, for the positive half cycle shown in FIG. 3, $β_t$ equals $(β_o + Δβ_1 + Δβ_2 + Δβ_3)$, where $Δβ_3$ is a negative value.

In step #34, from the number $2^N$ of the clock pulses generated during the half cycle of the source voltage and the above calculated quantity M, the fluctuating ratio $k_β$ of the source voltage period is calculated by the use of the equation given below:

$$k_β = M/2^N \qquad (7)$$

In step #35, the value for $β_t$ is reset to zero and a series of processing operations are finished. The fluctuating ratio $k_β$ obtained in this series of processing operations shown in FIG. 6 is used as a coefficient for correcting the setting value used to control the firing phase during the next half cycle of the source voltage.

The processing shown in FIG. 7, which is repeated at a period $T_1$, is nearly the same as that shown in the first embodiment in FIG. 4. The only difference is the addition of the three steps #6', #20 and #21. Namely, in the step #6', the value of the phase control signal β derived from the speed deviation is corrected by the use of the above obtained fluctuating ratio $k_β$ of the source voltage period and the quantity $k_β·β$ is used as a new phase control signal. The thus corrected phase control signal $k_β·β$ is added to the count value γ read out of the counter 9 and the sum is again set in the counter 9. The steps #20 and #21 are dedicated to the calculation of $β_t$. Namely, in the step #20, the difference between the value DIN actually set in the counter 9 and the value γ read out of the counter 9 is calculated and in the step #21 such differences are sequentially accumulated to obtain $β_t$.

As described above, according to the second embodiment of this invention, firing pulses having desired phases can be obtained irrespective of the fluctuation of the source voltage frequency. In the conventional system, if there is a fluctuation in the source voltage frequency, a phase-locked loop circuit must be used in order to synchronize the repetition frequency of the clock pulses generated by the clock pulse generator with the source voltage frequency. According to this embodiment, on the other hand, since use is made of an oscillator which generates clock pulses having a constant frequency, a compact and inexpensive phase control with high precision can be realized.

The two embodiments described above are both concerned exclusively with the method and apparatus for controlling the firing phases of the thyristors intended to convert a single-phase ac power to a dc power, but this invention can, needless to say, be equally applied also to a system for converting a three-phase ac power to a dc power. For such an application, three firing pulse control circuits each equivalent to the circuit 2 in FIG. 2 or 5 should be provided. In that case, only one pulse generating circuit is provided since three counters are connected in common with the pulse generator.

We claim:

1. A method of controlling the firing phases of thyristors, comprising:
    counting clock pulses having a predetermined period, by means of a counter
    resetting said counter each time the voltage of an ac power source crosses zero;
    reading out the count value of said counter at any desired moment after said resetting step and setting in said counter data obtained by correcting said count value by the use of a value corresponding to the firing phase;
    reading out the count value of said counter at any desired moment after said data setting step and setting in said counter data obtained by correcting said count value by the use of a value corresponding to the variation of the firing phase; and
    delivering an output pulse from said counter when said counter overflows, said output pulse causing firing pulses for said thyristors to be produced.

2. A method according to claim 1, wherein, if a value to be set in said counter exceeds the maximum count value of said counter, said maximum count value is set in said counter instead of said corrected data.

3. A method according to claim 1, wherein the count value read out of said counter at the time of setting said data representative of the firing phase is compared with an expected value calculated on the basis of the value set in said counter in the last setting operation, an alarm being generated when a difference between both the values exceeds a predetermined value.

4. A method according to claim 1, further comprising:
    accumulating respective corrected quantities for said data obtained by correcting said count value of said counter by the use of said value corresponding to the firing phase each time such data is set in said counter during the half cycle of the voltage of said ac power source;
    calculating the number of said clock pulses actually applied to said counter during said half cycle on the basis of the accumulated amount of said corrected quantities and the count value read out of said counter at the end of said half cycle; and
    calculating a fluctuating ratio of the period of the voltage of said ac power source on the basis of said calculated number.

5. A method according to claim 4, wherein the setting of said data representative of the firing phase includes correcting the count value read out of said counter by the use of said fluctuating ratio and setting the corrected value in said counter.

6. An apparatus for controlling the firing phases of plural thyristors as a power converter connected between an ac power source and a load, comprising:
    synchronous signal generating means for generating a synchronous signal each time the voltage of said ac power source crosses zero;
    a counter for counting clock pulses having a predetermined period, said counter being reset by said synchronous signal and the firing timing of said thyristors being determined by overflow pulses delivered from said counter;
    a distributing circuit for properly distributing said overflow pulses to produce respective firing signals for said thyristors; and
    digital arithmetic processing means for periodically calculating values representative of the firing phases in accordance with a stored program, reading the count value out of said counter, setting in said counter the sum of said count value read out of said counter and said calculated value representative of said firing phase to perform the setting of said firing phases, and setting in said counter the sum of said count value read out of said counter and the variation of said calculated value representative of said firing phase to perform the alteration of said firing phases.

7. An apparatus for controlling the firing phases of plural thyristors as a power converter connected between an ac power source and a load, comprising:
    synchronous signal generating means for generating a synchronous signal each time the voltage of said ac power source crosses zero;
    a counter for counting clock pulses having a predetermined period, said counter being reset by said synchronous signal and delivering overflow pulses to determine the firing timing of said thyristors;
    a flip-flop which is set when data is in said counter and which is reset by said synchronous signal; and
    digital arithmetic processing means for periodically calculating said firing phases in accordance with a stored program, setting in said counter the sum of the count value read out of said counter and the calculated value representative of the firing phase and setting said flip-flop when said flip-flop delivers no output, and adding the difference between the preceding and present calculated values representative of the firing phases to the count value read out of said counter and setting the results of such addition in said counter when said flip-flop delivers an output.

8. A method of controlling the firing phase of a semiconductor element connected to an ac voltage, comprising:
    calculating at least twice during a half cycle of said ac voltage a control command corresponding to a phase at which a firing pulse of the semiconductor element is to be outputted;
    counting clock pulses having a predetermined period by means of a counter;
    setting in said counter each time the control command is calculated a value equivalent to that value corresponding to the calculated control command which has been set in said counter at the start time of said half cycle of said ac voltage;

providing an output pulse when said counter counts to a predetermined value minus said value set in said counter; and producing the firing pulse of said semiconductor element by means of said output pulse.

9. A method according to claim 8, wherein said counter has a presettable overflow terminal.

10. A method according to claim 8, wherein, if said value to be set in said counter exceeds said predetermined value of said counter, said predetermined value is set in said counter instead of said value to be set.

11. A method according to claim 8, further comprising:

reading out the count value of said counter at the time of said setting of said counter;

comparing said count value read out of said counter with an expected value calculated on the basis of the value set in said counter in the last setting operation; and generating an alarm when the difference between both the values compared exceeds a predetermined value.

12. A method according to claim 8, further comprising:

accumulating respective corrected quantities obtained by correcting the count value of said counter by the use of a value corresponding to the firing phase, each time said setting of said counter is effected during the half cycle of said ac voltage;

calculating the number of said clock pulses actually applied to said counter during said half cycle on the basis of the accumulated amount of said corrected quantities and the count value read out of said counter at the end of said half cycle; and calculating the fluctuating ratio of the period of said ac voltage on the basis of said calculated number.

13. A method according to claim 12, wherein said setting of said counter includes correcting the count value read out of said counter by the use of said fluctuating ratio and setting the corrected value in said counter.

14. An apparatus for controlling the firing phase of a semiconductor element connected to an ac voltage, comprising:

first means for calculating at least twice during a half cycle of said ac voltage a control command corresponding to a phase at which a firing pulse of the semiconductor element is to be outputted;

a counter for counting clock pulses having a predetermined period;

second means for calculating, each time the control command is calculated, a count value equivalent to the calculated control command which has been obtained at the start of said half cycle of said ac voltage and a value corresponding to said calculated control command which has been set in said counter at the start of said half cycle of said ac voltage;

third means for setting said count value in said counter;

fourth means for providing an output pulse when said counter counts a predetermined value minus said count value set in said counter by said third means; and fifth means for producing the firing pulse of said semiconductor element in response to said output pulse of said fourth means.

15. An apparatus according to claim 14, wherein said counter has a presettable overflow terminal.

* * * * *